United States Patent
Loncke et al.

(10) Patent No.: US 6,889,852 B1
(45) Date of Patent: May 10, 2005

(54) LAYERED FILTERING STRUCTURE

(75) Inventors: Jan Loncke, Zwevegem (BE); Johan Vandamme, Deinze (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/869,802

(22) PCT Filed: Dec. 9, 1999

(86) PCT No.: PCT/EP99/09719

§ 371 (c)(1),
(2), (4) Date: Sep. 24, 2001

(87) PCT Pub. No.: WO00/40323

PCT Pub. Date: Jul. 13, 2000

(30) Foreign Application Priority Data

Aug. 1, 1999 (EP) ............................................ 99200036

(51) Int. Cl.$^7$ .............................................. B01D 39/20
(52) U.S. Cl. ...................... 210/490; 210/496; 210/499; 210/510.1; 419/2; 428/549; 428/615
(58) Field of Search ................................ 210/490, 496, 210/499, 500.25, 510.1, 335, 491; 419/2; 428/549, 615

(56) References Cited

U.S. PATENT DOCUMENTS

| | | | | |
|---|---|---|---|---|
| 2,082,513 A | * | 6/1937 | Roberts ........................ 210/490 |
| 3,379,000 A | | 4/1968 | Webber et al. ................. 57/139 |
| 3,437,457 A | * | 4/1969 | Fisher .......................... 428/605 |
| 3,469,297 A | * | 9/1969 | Webber ........................ 428/605 |
| 4,126,560 A | * | 11/1978 | Marcus et al. ............... 210/489 |
| 4,983,467 A | * | 1/1991 | De Bruyne et al. .......... 428/605 |
| 5,637,216 A | * | 6/1997 | Dillier ......................... 210/335 |

FOREIGN PATENT DOCUMENTS

| EP | 0 561 001 A1 | 4/1993 |
|---|---|---|
| GB | 1190844 | 5/1970 |
| WO | 94/14608 | 7/1994 |

* cited by examiner

Primary Examiner—Matthew O. Savage
(74) Attorney, Agent, or Firm—Foley & Lardner LLP

(57) ABSTRACT

A layered filtering structure (10) comprises at least a first layer (12) and a second layer (13). Each layer comprises a web of metal fibers which has been sintered. The two layers (12, 13) are in contact with each other. The first layer, most close to the filter inlet side has a porosity below 55%, and the second layer, closer to the filter outlet side has a porosity which is at least 20% greater than the porosity of the first layer. The first layer is compacted in a separate manufacturing step. The layered filtering structure combines the advantage of a small filter rating with a low pressure drop.

14 Claims, 1 Drawing Sheet

LAYERED FILTERING STRUCTURE

FIELD OF THE INVENTION

The present invention relates to a layered filtering structure which is adapted for micro-filtration purposes. The term "micro-filtration" refers to filtering structures which are able to retain particles with a maximum size of between 0.5 µm and 10 µm, in particular below 2 µm.

BACKGROUND OF THE INVENTION

Presently available filter material for applications such as micro-filtration and for in situ cleanable filtration media conveniently comprise ceramic membrane layers fixed to the surface of porous sintered metal powder or metal fiber substrates. The high pressure drop across these filter laminates, however, is a considerable drawback since the filtering process requires additional energy due to the high pressure and robust mechanical supports for the filter layers. In addition, repeated backflushing is difficult and, after all, the ceramic layers are quite brittle, which adversely affects durability.

SUMMARY OF THE INVENTION

It is an object of the present invention to avoid the drawbacks of the prior art.

It is also an object of the present invention to provide a filtering structure adapted for microfiltration without causing high pressure drops across the structure.

It is still another object of the present invention to provide a filtering structure which allows for repeated backflushing.

According to a first aspect of the present invention, there is provided a layered filtering structure which comprises at least a first layer and a second layer. Each layer comprises a web of metal fibers which have been sintered. The two layers are in contact with each other. The first layer, at the upstream side, so most close to the filter inlet side, has a porosity below 55%. The second layer, at the downstream side, so closer to the filter outlet side, has a porosity which is at least 20% greater than the porosity of said first layer. Preferably the porosity of the second layer is greater than 80%.

The first layer with the lower porosity determines the filter rating, i.e. the size of the particles the majority of which still pass the filter.

The fibers in the first layer preferably have a diameter of less than 3 µm, e.g. less than 2.5 µm, e.g. 2 µm.

The first layer preferably has a weight ranging from 300 g/m$^2$ to 600 g/m$^2$ so that its thickness is limited to a range of between 0.05 mm to 0.15 mm. Generally, the pressure drop over a filter is about proportional to its thickness. In this case, the limited thickness of the first layer limits the resultant pressure drop to an acceptable degree. The degree of pressure drop over the second layer is considerably lower than the pressure drop over the first layer due to the greater porosity of the second layer. So the total pressure drop over the whole filtering structure is about equal to the limited pressure drop over the first layer. An incoming fluid is immediately able to expand in the second layer once it has passed the first layer.

The diameter of the fibers in the second layer is preferably three times greater than the diameter of the fibers in the first layer.

In order to obtain the difference in porosity between the first layer and the second layer, the first layer is sintered and compacted separately and in advance. Only thereafter, this sintered and compacted first layer is brought in contact with the second layer and a second sintering operation takes place to sinter the fibers in the second layer and to bond the two layers together.

The reason for the separate sintering and compacting step of the first layer can be explained as follows.

Compacting two or more layers of metal fiber webs together leads to a degree of porosity in the layers which is about the same over the whole layered structure, and this is to a great extent independent of the fiber diameter in the different layers. This is in contrast with other filter media such as filter powders or filter particles. By separately sintering and compacting the first layer in advance, it is avoided that the second layer is compacted to more or less the same degree of the first layer.

In a preferable embodiment of the invention, the first layer has at least one even smooth surface in order to provide a good contact with the second layer.

A cold isostatic pressing operation is to be preferred for the compacting operation of the first layer, since this allows obtaining a homogeneous filter medium. Cold isostatic pressing, however, leads to a slightly rough surface and not to an even and smooth surface. Preference is here given to a cold isostatic pressing operation where the pressure is applied from one side and where the other side of the layer rests on an even and smooth support in order to obtain an even and smooth surface.

Preferably a wire net is fixed as support to the first layer or to the second layer. Most preferably the filtering structure is sandwiched between a first wire net fixed at the first layer at the inlet side and a second wire net fixed at the second layer at the outlet side. The meshes of the first wire net are smaller than the meshes of the second wire net. The diameters of the wires of the first wire net are smaller than the diameters of the wires of the second wire net.

Next to the function of support the first wire net still has another function and advantage. This first wire net generates some turbulence in the incoming flow which improves the anti-fouling behavior.

According to a second aspect of the present invention, there is provided a method of manufacturing a layered filtering structure. The method comprises the following steps:

(a) sintering a web of metal fibers to form a first layer;
(b) compacting the first layer to a porosity below 55%
(c) providing a web of metal fibers to form a second layer;
(d) bringing the first compacted layer and the second layer in contact with each other to form a layered assembly;
(e) sintering the layered assembly to form a coherent entity wherein the second layer has a porosity which is at least 20% higher than the porosity of the first layer.

Preferably the compacting step is done by means of a cold isostatic pressing operation.

BRIEF DESCRIPTION OF THE DRAWINGS

The invention will now be described into more detail with reference to the accompanying drawing wherein.

DESCRIPTION OF A PREFERRED EMBODIMENT OF THE INVENTION

Figure 1:
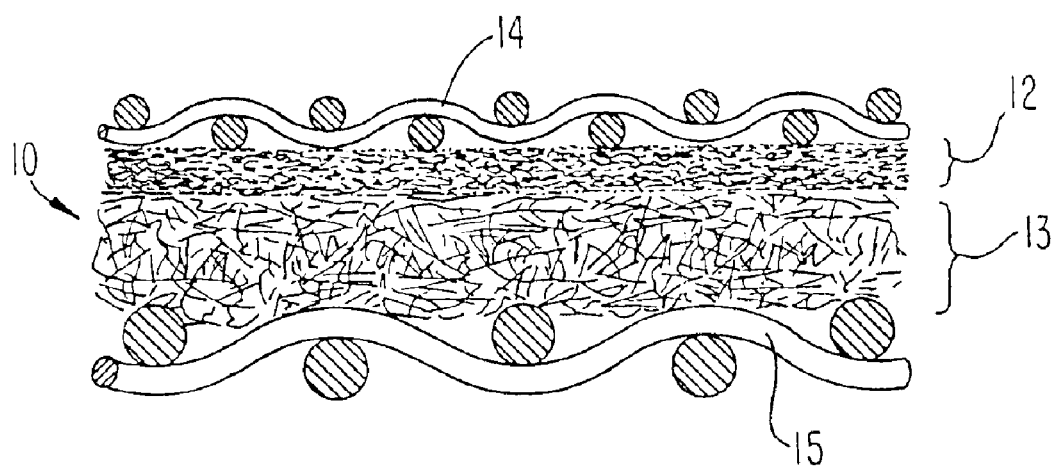
FIG. 1 shows an enlarged view of a cross-section of a layered filtering structure according to the invention.

First Example.

Referring to FIG. 1, a layered filtering structure 10 according to the invention comprises a first layer 12 of a sintered and compacted fiber web. The fibers in the first layer have a diameter of 2 μm. The weight of the first layer is 450 g/m². The thickness is about 0.10 mm.

The first layer 12 is via a smooth and even surface direct in contact with a second layer 13 of a sintered fiber web. The fibers in the second layer have a diameter of 8 μm. The weight of the second layer is 225 g/m².

A first wire net 14 is fixed to the first layer 12. This first wire net 14 has been rolled to a thickness of 0.17 mm and has 48 meshes per inch (1 inch=25.4 mm). Its weight is 380 g/m².

A second wire net 15 is fixed to the second layer 13. This second wire net 15 has a thickness of 0.45 mm and has 40 meshes per inch. Its weight is 1220 g/m².

A filtering structure as shown in FIG. 1 can be made in the following way.

Steel fibers with a diameter of 2 μm are obtained by means of the technique of bundled drawing, such as described in U.S. Pat. No. 3,379,000. A first non-woven web is then produced by means of a rando-feeder apparatus which transforms the steel fibers into a web such as disclosed in GB 1 190 844 (which corresponds to U.S. Pat. No. 3,469,297). The web is then sintered separately and compacted by means of a cold isostatic pressing operation carried out at a pressure higher than 2000 bar to obtain a porosity lower than 55%, e.g. lower than 50%, e.g. 46%. This results in the first layer 12.

Steel fibers with a diameter of 8 μm are obtained with the above-mentioned technique of bundled drawing and are used to provide a second non-woven web. This second non-woven web will form the second layer 13. The second non-woven web is put on the second wire net 15 and the first layer 12 is put with its even surface on the second non-woven web. A first wire net 14, which has been pre-rolled, is put on the first layer. The thus obtained layered assembly is sintered together under a light pressure to obtain the layered filtering structure 10.

The layered filtering structure according to the invention has been subjected to a conventional textest for measuring the air permeability and to a bubble point pressure test. The results are given hereunder.

|  | First layer | Whole filter |
| --- | --- | --- |
| Weight (g/m²) | 450 | 2275 |
| Thickness (mm) |  | 1.02 |
| Global porosity (%) |  | 72.22 |
| Textest |  |  |
| Average (liter/dm²) |  | 3.00 ± 15% |
| Bubble point pressure test |  |  |
| Average (Pa) | 27000 ± 15% | 24520 ± 15% |
| Filter rating (μm) | 1.37 ± 15% | 1.51 ± 15% |

Second Example.

The same tests have also been applied to another layered filtering structure according to the invention. The difference with the structure of the first example, is now that the first layer is compacted not in an isostatical way. The first layer is now compacted between two plates until a thickness of about 0.10 mm is obtained.

|  | First layer | Whole filter |
| --- | --- | --- |
| Weight (g/m²) | 450 | 2275 |
| Thickness (mm) | 0.11 | 1.02 |
| Global porosity (%) | 46.63 | 72.22 |
| Textest |  |  |
| Average (liter/dm²) | 3.72 ± 15% | 5.72 ± 15% |
| Bubble point pressure test |  |  |
| Average (Pa) | 18750 ± 15% | 17430 ± 15% |
| Filter rating (μm) | 1.97 ± 15% | 2.12 ± 15% |

Other embodiments according to the invention may be envisaged. As a matter of example only, following layered filtering structures are given:

| diameter of filaments in first layer with low porosity (μm) | diameter of filaments in second layer with high porosity (μm) |
| --- | --- |
| 4 | 12 |
| 6.5 | 22 |
| 8 | 30 |

The material used for the filtering structure according to the invention may be conventional compositions such as stainless steel 316®, Hastelloy®, Inconel® or Nichrome®. The latter composition can be applied for gas filtration at a high temperature.

What is claimed is:

1. A layered filtering structure having a filter inlet side and a filter outlet side, said layered filtering structure comprising at least a first layer on a second layer, each layer comprising a web of metal fibers which has been sintered, said two layers being in contact with each other, wherein said first layer, most close to the filter inlet side has a porosity below 55%, and wherein said second layer, closer to the filter outlet side has a porosity of at least 80% and which is at least 20% greater than the porosity of said first layer, wherein said first layer and said second layer include metal fibers having a length ranging from one-half inch to six inches.

2. A structure according to claim 1, wherein said first layer comprises metal fibers with a diameter of less than 3 μm and wherein said second layer comprises metal fibers with a diameter of at least three times the diameter of the fibers in the first layer.

3. A structure according to claim 1 wherein said first layer has a weight ranging between 300 g/m² and 600 g/m².

4. A structure according to claim 1, wherein the first layer has at least one even surface.

5. A structure according to claim 1, wherein said structure further comprises a wire net which is fixed to the first layer or to the second layer.

6. A structure according to claim 1 wherein said structure is sandwiched between a first wire net and a second wire net, said first wire net comprising wires having a diameter d1, said second wire net comprising wires having a diameter d2, said first wire net being located at the inlet side, said second wire net having meshes and being located at the outlet side, and the first wire net having meshes which are smaller than the meshes of the second wire net and the diameter d1 of the wires of the first wire net being thicker than the diameter d2 of the wires of the second wire net.

7. A structure according to claim 6 wherein said first wire net is a calandered wire net.

8. A structure according to claim 1 wherein said first layer is obtainable by cold isostatic pressing operation.

9. A method of manufacturing a layered filtering structure, said method comprising:
  (a) sintering a web of metal fibers to form a first layer;
  (b) compacting said first layer to a porosity below 55%;
  (c) providing a web of metal fibers to form a second layer;
  (d) bringing said first compacted layer and the second layer in contact with each other to form a layered assembly;
  (e) sintering said layered assembly to form a coherent entity wherein said second layer has a porosity which is at least 20% higher than the porosity of the first layer;
  wherein said first layer and said second layer include metal fibers having a length ranging from one-half inch to six inches.

10. A method according to claim 9 wherein said compacting is done by a cold isostatic pressing operation.

11. A method according to claim 9, wherein said second layer has a porosity of at least 80%.

12. A method according to claim 9, wherein each layer comprises a non-woven web of metal fibers.

13. A method of manufacturing a layered filtering structure, said method comprising:
  (a) sintering a web of metal fibers to form a first layer;
  (b) compacting said first layer to a porosity below 55%;
  (c) providing a web of metal fibers to form a second layer;
  (d) bringing said first compacted layer and the second layer in contact with each other to form a layered assembly;
  (e) sintering said layered assembly to form a coherent entity wherein said second layer has a porosity which is at least 20% higher than the porosity of the first layer;
  wherein bringing the first compacted layer and the second layer in contact with each other to form a layered assembly occurs after providing a web of metal fibers to form the second layer.

14. A method of manufacturing a layered filtering structure, said method comprising:
  (a) sintering a web of metal fibers to form a first layer;
  (b) compacting said first layer to a porosity below 55%;
  (c) providing a web of metal fibers to form a second layer;
  (d) bringing said first compacted layer and the second layer in contact with each other to form a layered assembly;
  (e) sintering said layered assembly to form a coherent entity wherein said second layer has a porosity which is at least 20% higher than the porosity of the first layer;
  wherein bringing the first compacted layer and the second layer in contact with each other to form a layered assembly occurs after the second layer is formed.

* * * * *

UNITED STATES PATENT AND TRADEMARK OFFICE
CERTIFICATE OF CORRECTION

PATENT NO. : 6,889,852 B1
DATED : May 10, 2005
INVENTOR(S) : Jan Loncke et al.

It is certified that error appears in the above-identified patent and that said Letters Patent is hereby corrected as shown below:

Title page,
Item [30], Foreign Application Priority Data, date should read as follows:
-- January 8, 1999 --.

Signed and Sealed this

Twenty-third Day of August, 2005

JON W. DUDAS
*Director of the United States Patent and Trademark Office*